US011221942B2

(12) United States Patent
Sridhar et al.

(10) Patent No.: US 11,221,942 B2
(45) Date of Patent: Jan. 11, 2022

(54) SYSTEM AND METHODS FOR AMALGAMATION OF ARTIFICIAL INTELLIGENCE (AI) AND MACHINE LEARNING (ML) IN TEST CREATION, EXECUTION, AND PREDICTION

(71) Applicant: HEWLETT PACKARD ENTERPRISE DEVELOPMENT LP, Houston, TX (US)

(72) Inventors: Pavan Sridhar, Bangalore (IN); Deepak Panambur, Bangalore (IN); Rohith Panambur, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 10 days.

(21) Appl. No.: 16/820,615

(22) Filed: Mar. 16, 2020

(65) Prior Publication Data
US 2020/0341888 A1 Oct. 29, 2020

(30) Foreign Application Priority Data
Apr. 25, 2019 (IN) ............................. 201941016555

(51) Int. Cl.
G06F 11/00 (2006.01)
G06F 11/36 (2006.01)
(Continued)

(52) U.S. Cl.
CPC ...... G06F 11/3692 (2013.01); G06F 11/3476 (2013.01); G06F 11/3672 (2013.01);
(Continued)

(58) Field of Classification Search
CPC ............. G06F 11/3692; G06F 11/3476; G06F 11/3684; G06F 11/3688; G06F 11/3672; G06N 20/00
See application file for complete search history.

(56) References Cited

U.S. PATENT DOCUMENTS 8,527,813 B2 * 9/2013 Budnik ............... G06F 11/3688
714/32
9,032,360 B1 * 5/2015 Cohen ................. G06F 11/3684
717/103
(Continued)

OTHER PUBLICATIONS

Gove et al., "Identifying Infeasible GUI Test Cases Using Support Vector Machines and Induced Grammars", 2011 IEEE Fourth International Conference on Software Testing, Verification and Validation Workshops, Mar. 21-25, 2011, 10 pages.
(Continued)

Primary Examiner — Jonathan D Gibson
(74) Attorney, Agent, or Firm — Jaffery Watson Mendonsa & Hamilton

(57) ABSTRACT

Systems and methods provided for a software test automation platform including an artificial intelligence (AO/machine learning (ML) test analyzer. The AI/ML test analyzer can be a computer device operating with the software testing automation platform that is programmed to obtain run-time data from executing multiple software test cases for a software workload; obtain log data from the one or more test logs, relating to previous executions of the tests cases for the software workload. The AI/ML test analyzer can then analyze the log data and the run-time data by applying ML/AI tools, concurrently with executing the test cases, for recognizing patterns associated with the executed tests cases over a period of time, and automatically predicting an optimized set of test cases and analytics related to execution of the test cases for the software workload.

20 Claims, 6 Drawing Sheets

(51) Int. Cl.
    *G06F 11/34*     (2006.01)
    *G06N 20/00*     (2019.01)

(52) U.S. Cl.
    CPC ...... *G06F 11/3684* (2013.01); *G06F 11/3688* (2013.01); *G06N 20/00* (2019.01)

(56) References Cited

U.S. PATENT DOCUMENTS

| | | | |
|---|---|---|---|
| 9,519,477 | B2 | 12/2016 | Champlin-Scharff et al. |
| 9,582,408 | B1 | 2/2017 | Jayaraman et al. |
| 10,073,763 | B1* | 9/2018 | Raman ................ G06F 11/3476 |
| 10,515,002 | B2* | 12/2019 | Takawale ............... G06N 20/00 |
| 11,099,237 | B2* | 8/2021 | Nochilur .................... G06F 8/10 |
| 2015/0378873 | A1* | 12/2015 | Prasad ................ G06F 11/3684 |
| | | | 714/38.1 |
| 2016/0077956 | A1* | 3/2016 | Bhattacharya ...... G06F 11/3688 |
| | | | 717/124 |
| 2016/0232085 | A1* | 8/2016 | Vorganti ............. G06F 11/3684 |
| 2017/0010959 | A1 | 1/2017 | Smith et al. |
| 2018/0069967 | A1* | 3/2018 | Mandry ................ G06F 3/1204 |
| 2018/0173606 | A1* | 6/2018 | Malla .................. G06F 11/3688 |
| 2018/0197103 | A1* | 7/2018 | Petursson ............. G06N 20/00 |
| 2018/0267887 | A1* | 9/2018 | Dsouza ............... G06F 11/3688 |
| 2019/0213115 | A1* | 7/2019 | Takawale .................. G06F 8/30 |
| 2020/0004667 | A1* | 1/2020 | Seshadri ................. G06F 11/36 |
| 2020/0073788 | A1* | 3/2020 | Saha .................. G06F 11/3688 |
| 2020/0310948 | A1* | 10/2020 | Culibrk ................. G06N 7/005 |
| 2020/0341888 | A1* | 10/2020 | Sridhar ............... G06F 11/3692 |

OTHER PUBLICATIONS

Paul C., "Types of Software Testing", available online at <https://www.functionize.com/blog/types-of-software-testing/>, Jul. 17, 2018, 8 pages.

* cited by examiner

SYSTEM AND METHODS FOR AMALGAMATION OF ARTIFICIAL INTELLIGENCE (AI) AND MACHINE LEARNING (ML) IN TEST CREATION, EXECUTION, AND PREDICTION

DESCRIPTION OF RELATED ART

In the realm of software development, time to market is often a key parameter for consideration during the developmental stages. Accordingly, a test cycle for any particular software application should not be too time consuming, in order to pave the way for a quicker release to market. Often times, there is a need to update test cases that are used during software testing, in order to identify controls and detect links between defects and components in an effective manner. Some existing software testing frameworks leverage automation for a more time efficient interaction with the system (in comparison to manual testing). Nonetheless, automated software testing, in and of itself, may not be capable of providing a streamlined procedure that distinguishes between the correct and incorrect behaviors of the components in the testing landscape. On the other hand, manual software testing approaches may be limited to relying solely on human-based analysis for pinpointing a root cause in the event of a test failure. In many instances, a failure experienced during software testing can stem from a plethora of potential causes, and manually considering each potential problem may substantially lengthen the test cycle. Consequently, some existing software testing frameworks may be unfavorable with respect to a shorter development life cycle, and even further may not be sustainable in scenarios involving substantially large test cases.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
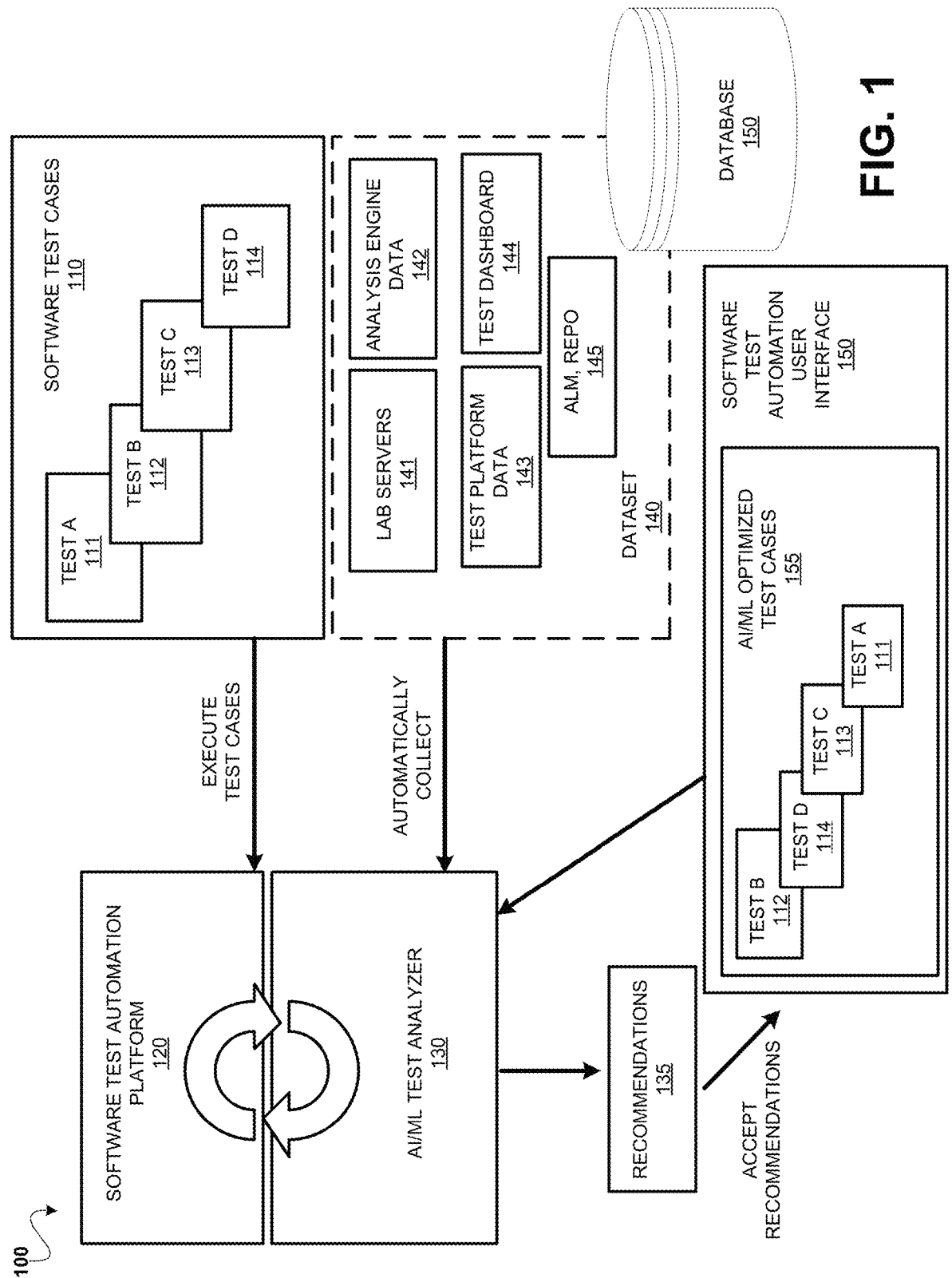
FIG. 1 illustrates an example of a system for software test automation, including a test analyzer that implements artificial intelligence (AI) and machine learning (ML) for optimization of software testing, according to some embodiments.

The figures are not exhaustive and do not limit the present disclosure to the precise form disclosed.

DETAILED DESCRIPTION

Various embodiments described herein are directed to systems and techniques for optimization of software testing automation by utilizing an amalgamation of artificial intelligence (AI) and machine learning (ML) in test creation, test execution, and test prediction. A software automation platform is described herein that includes an AI/ML test analyzer. The AI/ML analyzer is designed to leverage the robust capabilities of AI/ML to provide an analysis of software tests used during automated software testing, so as to improve the overall performance and efficiency of the automation. For example, the AI/ML test analyzer can apply various AI/ML approaches during its analysis of a software test suite, which includes a predetermined sequence of software test that may have been selected by a software engineer. The AI/ML analyzer can use AI/ML techniques in conjunction with collected software test log data in order to predict an optimal combination of software tests for the software suite, which may include newly added software tests, and/or a rearranged sequence of software tests as compared to the human-generated software test suite. Even further, the AI/ML analyzer has adaptability with respect to its integration into the software development lifecycle. That is, the AI/ML test analyzer can be configured to perform its AI/ML-driven analysis at a lifecycle stage that is dynamic with respect to software testing automation (e.g., during the execution of the software test) or at stage that is more static with respect to software testing automation (e.g., before the software tests are executed).

Software test automation can aid with test execution by automating various processes involved with the test effort. For instance, the number of software tests that are run before completing a validation effort in a particular subsystem vis-à-vis a server, storage network, or a combination of these, helps to generate and collect vast amounts of information, such as results from the software tests, which can be compiled into software test logs. The accumulation of such software test logs can be valuable, as the logs often contain crucial information about the various sub-systems involved in the test life cycle of a software product. Since, in some instances, each of the sub-systems are interdependent, a potential issue in a single element can have adverse effects that can further extend to other sub-systems (e.g., when the errors are not properly addressed).

As an example, design choices regarding which test suites are best suited for checking the software application can be an impactful aspect for software test automation. Although software testing uses automation in some areas, creating the software suite is often a human driven process, for instance a software testing engineer can develop the software suite. Furthermore, human interaction is often involved during the execution of the test suites in some existing software testing frameworks. A software engineer can decide whether to continue a particular software test, or to abort versus running a specific software test based on a set of criteria considering various parameters (e.g., software test logs, previous software product knowledge, set of test cases, Operating Systems, etc.). In some instances, the decision making is based on criteria and current system behavioral patterns. Accordingly, validation checks and patterns in an automated software testing system typically wait until the software tests are completed. Then, if errors are encountered, testing can be followed by corrective measures or performing an errortriggered flow. Many of the available software testing automation tools focus only on post-execution corrective measures to improve the testing process. Nonetheless, analysis of the obtained test results can be a key parameter to decide, in a dynamic manner, on next steps and/or decisions to be taken during the execution of the software tests. The software testing automation platform, disclosed herein, has the capability to support decisions on the test suite during the execution of the software test (in addition to pre-testing and post-testing), thereby extending automation of the overall testing process and reducing the length of the testing cycle. For example, the AI/ML test analyzer allows for various testing decisions that can be made concurrently to running a software test suite, including but not limited to: ignoring an error; employing a workaround; changing the test sequence; halting the test; or fixing the test.

Referring now to the drawings, FIG. 1 illustrates an example of a system for software test automation 100. As seen in FIG. 1, the system 100 includes a software test automaton platform 120; and AI/ML test analyzer 130; database(s) 150; and software test automation user interface 150. Testing, as alluded to above, is an import process in the software development lifecycle, which can help to safeguard against potential failures that may prove to be detrimental to the overall function of a software application and impact customer satisfaction. Often times, software testing is a planned process, in which an overall threshold and risks associated with the software application's implementation is assessed and analyzed under certain conditions. The software test automation platform 120 can be computer device(s) programmed, or otherwise configured to, automatically perform actions involved in executing software test cases 110. In some instances, the software testing platform 120 includes automated capabilities that can abstract away the low-level complexity associated with more manual-based software testing. For instance, a software testing engineer can create a comprehensive set of software test cases 110 using the software testing platform 120 without programming. Also, the software testing platform 120 can be used to execute the software test cases 110 in a substantially automated manner, with limited (or no) user interaction. As an example, the software automation platform 120 implements various tools that automatically execute testing by running through several cases defined by the software test cases 110. The software test cases 110 can be multiple test scripts that are designed to create test environments which validate data (e.g., input, outputs) and assess the overall quality of a software application (also referred to herein as a software workload). In the illustrated example, the software test cases 110 can include multiple software tests in a predetermined sequence to govern an order of execution during testing, shown as Test A 111, Test B 112, Test C 113, and Test D 114. In some embodiments, the software test automation platform 120 can be a mobile computer device, such as a laptop computer or tablet.

Also shown in FIG. 1, the system 100 can include an AI/ML test analyzer 130. In accordance with the disclosed embodiments, the AI/ML test analyzer 130 applies an amalgamation of AI and ML techniques to for test creation, test execution, and test prediction to enhance the testing process. As referred to herein, AI can be described as automated computer processes that can intelligently leverage data analysis for training itself for further optimizing the processes. ML can be generally considered an application of AI. AI/ML techniques can include various approaches that are used in the area to achieve automated data analysis, such as natural language processing (NLP), neural networks, text analysis, and so on. For example, by employing the AI/ML test analyzer 120, the software test automation platform can significantly reduce the cost, time spent, and complexity of the software testing process while driving improved quality (e.g., streamlining software testing and making it more efficient). Thus, system 100 can implement an AI/ML-driven testing platform that can recognize changed controls more efficiently than a human, in many cases. Even further, the AI/ML test analyzer 130 can assists developers in determining which tests need to run to get the greatest coverage when limited time to test is a critical factor. The AI/ML test analyzer 130 can integrate AI/ML algorithms in test creation, execution and data analysis, in a manner that can further automate updates to test cases, identification of controls, and determining links between defects and components with increased efficiency (in comparison to human-driven processes). As illustrated in FIG. 1, the AI/ML test analyzer 130 can automatically collect data, such as logs related to previously run tests, as a dataset 140. In the illustrated example, the dataset 140 can include lab server logs 141, analysis engine data 142, test platform data 143, test dashboard 144, and Application Life Management (ALM)/REPO data 145. In some cases, the dataset 140 can be stored in database 150. As shown, the database 150 is accessible to the AI/ML test analyzer 130 and the software test automation platform 120 allowing data, such as dataset 150, to be stored and retrieved, as needed. According to the embodiments disclosed herein, various AI/ML techniques can be applied to the dataset 140.

FIG. 1 additionally illustrates that the AI/ML test analyzer 130 can receive data from the software test automation platform 120. For instance, run-time data associated with executing the software test cases 110 can be received by the AI/ML test analyzer and analyzed using AI/ML techniques. Accordingly, the system 100 can dynamically analyze run-time data during testing a software workload in combination with analyzing the dataset 140 having valuable information resulting from previous tests runs.

Although the AI/ML test analyzer 130 is shown in the illustrated example as a separate element, it should be appreciated that the AI/ML test analyzer 130 can be integrated into the software test automation platform 120. Accordingly, in an example, the software test automation platform 120 and the AI/ML test analyzer 130 can be implemented on a single computer device, such as a desktop computer. Furthermore, according to various implementations, the AI/ML test analyzer 130 and components described herein may be implemented in hardware and/or software that configures hardware. As such, the AI/ML test analyzer 130 can include executable instructions, computer components, or a combination of both that implement the specific functions of the AI/ML-driven test analysis aspects of the embodiments. The AI/ML test analyzer 130 can use the dataset 140 (including historical log data) and data from the software test automation platform 120 while it runs tests, to concurrently analyze the data using AI/ML. This analysis information can be fed to the software test automation platform 120 in a manner that can modify the course and flow of the test in order to optimize the test's performance. In some instances, automated analysis performed by the AI/ML test analyzer 130 can continue to run through the duration of testing, thereby enabling any new and/or updated data executed by the software test automation platform 120 in the course of testing the software workload to be dynamically analyzed using AI/ML.

Also, FIG. 1 shows that the system 100 can include a software test automation user interface (UI) 150. The software test automation UI 150 can be implemented as a graphical user interface (GUI) for displaying data and visual representations (e.g., results, etc.) related to the software testing. Additionally, the software automation UI 150 can receive various user-configurable parameters entered by a user, such as a software testing engineer. As illustrated in FIG. 1, the software test automation UI 150 can receive recommendations 135 as an output generated by the AI/ML test analyzer. Therefore, the embodiments can provide the user with the capability to dynamically adapt the test cases 110 to optimize the process, during testing. In the illustrated example, the software test automation UI 150 can display an optimized set of test cases 155. In accordance with the embodiments, the AI/ML optimized test cases 155 can be a set of test cases that have been automatically generated by the system 100 and include test cases that need to run to get optimal results for a particular software workload, based on trends identified during AI/ML-driven analysis. In some cases, the recommendations 135 can be communicated to the software UI to prompt the user for further interaction with the system 100. In the example of FIG. 1, a software testing engineer can enter input via the software test automation UI 150 in order to accept and/or reject the AI/ML optimized test cases 155. Thus, the system 100 provides additionally flexibility to allow for human-intervention in the automation, when deemed necessary. Alternatively, the system 100 can be configured to automatically execute any recommendations 135 produced by the AI/ML test automation platform 120, such that the level of automation in the testing process is maximized.

Figure 2:
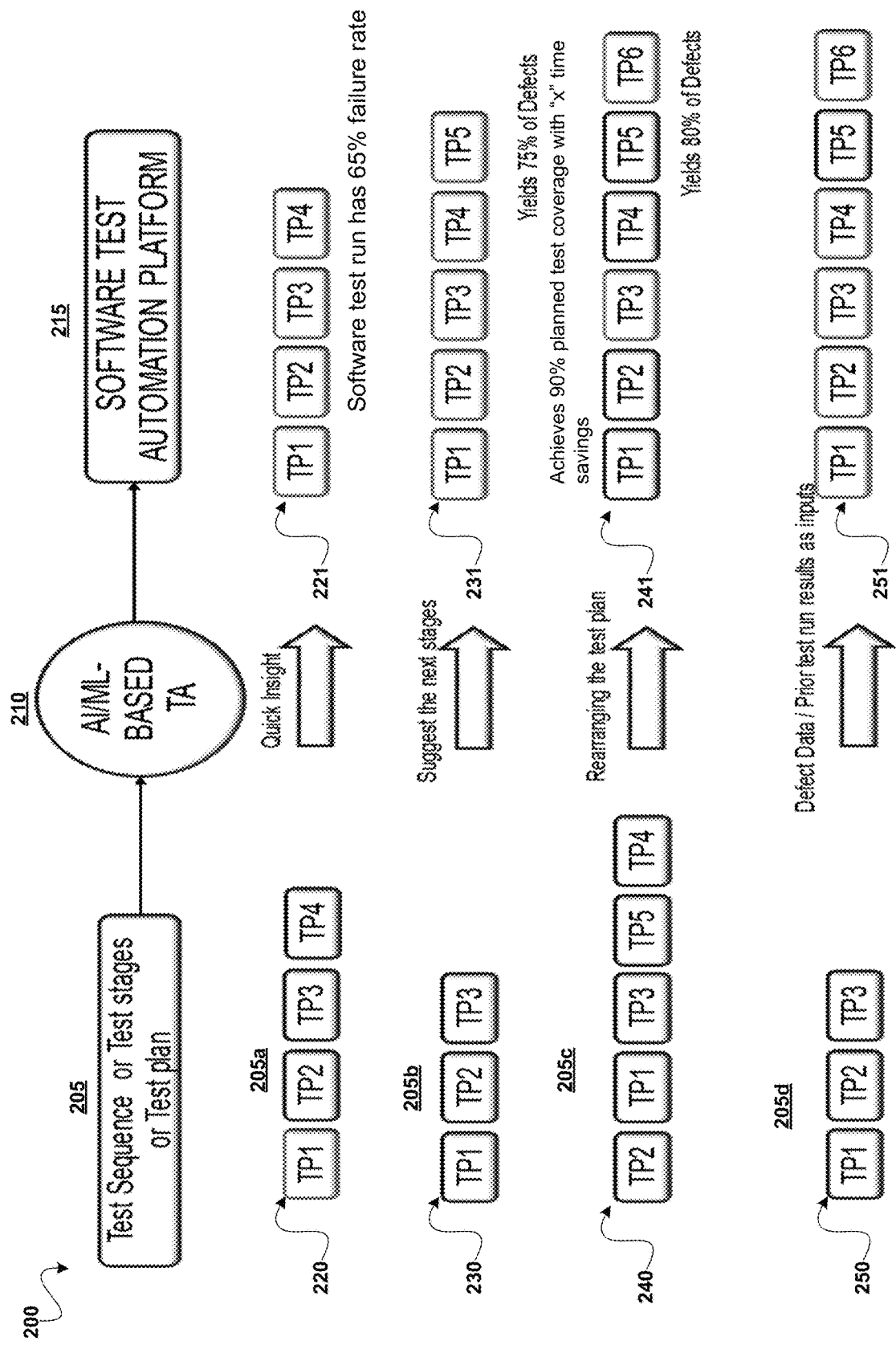
FIG. 2 is a conceptual diagram illustrating multiple examples of software test cases through analysis by the AI/ML test analyzer, and presentation by the software test automation platform shown in FIG. 1, according to some embodiments.

FIG. 2 depicts multiple examples of software test cases, or test plans 205 (shown in FIG. 2 as "TP") as communication flows through the AI/ML test analyzer 210, and the software test automation platform 215. As a general description, each test plan 205 can be received and automatically analyzed by the AI/ML test analyzer 210 according to the AI/ML techniques described herein (e.g., natural language processing, text analysis, etc.), referred to as stage 1 of a flow. The AI/ML test analyzer 210 can generate various outputs related to an optimization of the test plans 205 (e.g., recommendations, optimized test plans), which then can be communicated to the software test automation platform 215, referred to as stage 2 of a flow. As illustrated in FIG. 1, communicating output data from the AI/ML test analyzer 210 to the software test automation platform 215 can involve displaying the analysis results to a user via a GUI.

FIG. 2 shows each communication flow separated into the two principal stages described above, stage 1 and stage 2. In detail, FIG. 2 illustrates flow 220-221, flow 230-231, flow 240-241, and flow 250-251. Flow 220-221 includes four test plans (shown in FIG. 2 as "TP1", "TP2", "TP3", and "TP4"). It should be appreciated in the example, that the test plans 205 in stage 1 of each flow 220, 230, 240, and 250 (e.g., first stage) are received by the AI/ML test analyzer 210 in a particular order. In flow 220, the AI/ML test analyzer 210 receives the test plans 205*a* and performs a type of analysis from its capabilities, for example "quick insight." In some embodiments, "quick insight" may involve an AI/ML-driven analysis of the test plans 205*a* in order to predict performance of the test cases therein, such as generating predicted metrics and quality assessment data pertaining running the test plans 205. FIG. 2 shows an example of results that may be produced in response to a "quick insight" analysis, where AI/ML analysis from flow 220 yields that the test plan 205*a* has a predicted 65% failure rate.

In reference to flow 230-231, the test plans 205*b* (shown in FIG. 2 as "TP1", "TP2", "TP3") can be received by AI/ML test analyzer 210 during stage 1, which is flow 230. In this example, the AI/ML test analyzer 210 employs AI/ML-driven analysis so to perform another type of analysis within its capabilities, that is predicting next stages that may be optimal for testing. In some embodiments, "next stages" may involve an AI/ML-driven analysis of the test plans 205*b* in order to predict additional test cases that can be added to the test plans 205*b* received at 220 that may improve, or otherwise optimize, the overall performance of testing for a particular workload. FIG. 2 shows an example of results that may be produced in response to a "next stages" analysis, where AI/ML analysis from flow 230 generate a suggestion to add new test plans. In the illustrated example, the AI/ML test analyzer 210 can communicate in flow 231 a recommendation to extend the test plans 205*b* by adding test "TP4" and "TP5." In accordance with some embodiments, after the software test platform 215 receives the recommendation from the AI/ML test analyzer, in flow 231, a user can accept or reject the recommendation to control whether the automated integration into testing.

Referring now to flow 240-241, the test plans 205*c* (shown in FIG. 2 as "TP1", "TP2", "TP3", "TP5" and "TP4") can be received by AI/ML test analyzer 210 in flow 240. After the test plans 205*c* are obtained, the AI/ML test analyzer 210 can perform yet another type of analysis from its capabilities. In this example, the AI/ML test analyzer 210 can predict a rearrangement of the test plan 205*c* that may be optimal for testing. In some embodiments, "rearrangement" may involve an AI/ML-driven analysis of the test plans 205*c*, in order to predict a modified sequence of the test plans 205*c*, where the sequence has been adapted to be optimal for a particular software workload. FIG. 2 shows an example of results that may be produced in response to a "rearrangement" analysis, where AI/ML analysis from flow 240 has modified the sequence to "TP1", "TP2", "TP3", "TP4", "TP5", and "TP6" (newly added). In the illustrated example, the AI/ML test analyzer 210 can communicate the rearranged test plans to the software test automation platform 215 in flow 241.

Also, FIG. 2 includes flow 250-251, where the test plans 205*d* (shown in FIG. 2 as "TP1", "TP2", and "TP3") are received by AI/ML test analyzer 210 in stage 1, which is flow 250. Next, the AI/ML test analyzer 210 can perform yet another type of analysis from its capabilities. In response to receiving test plans 205*d*, the AI/ML test analyzer 210 can apply the AI/ML techniques disclosed herein to automatically add any defect yielding test cases to the test plans 205*d*. In some embodiments, "defect yielding test cases" may involve an AI/ML-driven analysis that is used to determine one or more test cases that have successfully identified software defects in prior tests (e.g., based on AI/ML trends observed in data from previous test runs). Furthermore, the AI/ML test analyzer 210 can automatically add the determined "defect yielding" test cases, which are not already included in the test plans 250*d* received in flow 250, to the testing. Accordingly, the AI/ML test analyzer 210 can optimize the test cycle for a particular software workload, by increasing the potential for actually using successful defect yielding test cases during a test run. In the example of FIG. 2, it can be assumed that "TP4", "TP5", and "TP6" were determined to be "defect yielding" based on AI/ML of test data accessible to the system. As a result, in response to the "defect yielding test cases" analysis, the AI/ML test analyzer 210 modified the sequence to "TP1", "TP2", "TP3", "TP4" (e.g., newly added), "TP5" (e.g., newly added), and "TP6" (e.g., newly added). The AI/ML test analyzer 210 can communicate the test plans, including the test cases automatically added by the system, to the software test automation platform 215 in flow 251. The capabilities discussed in reference to FIG. 2 above are intended to provide examples of the system's functionality for purposes of illustration, but it should be understood that the system is not limited to these functions.

Figure 3:
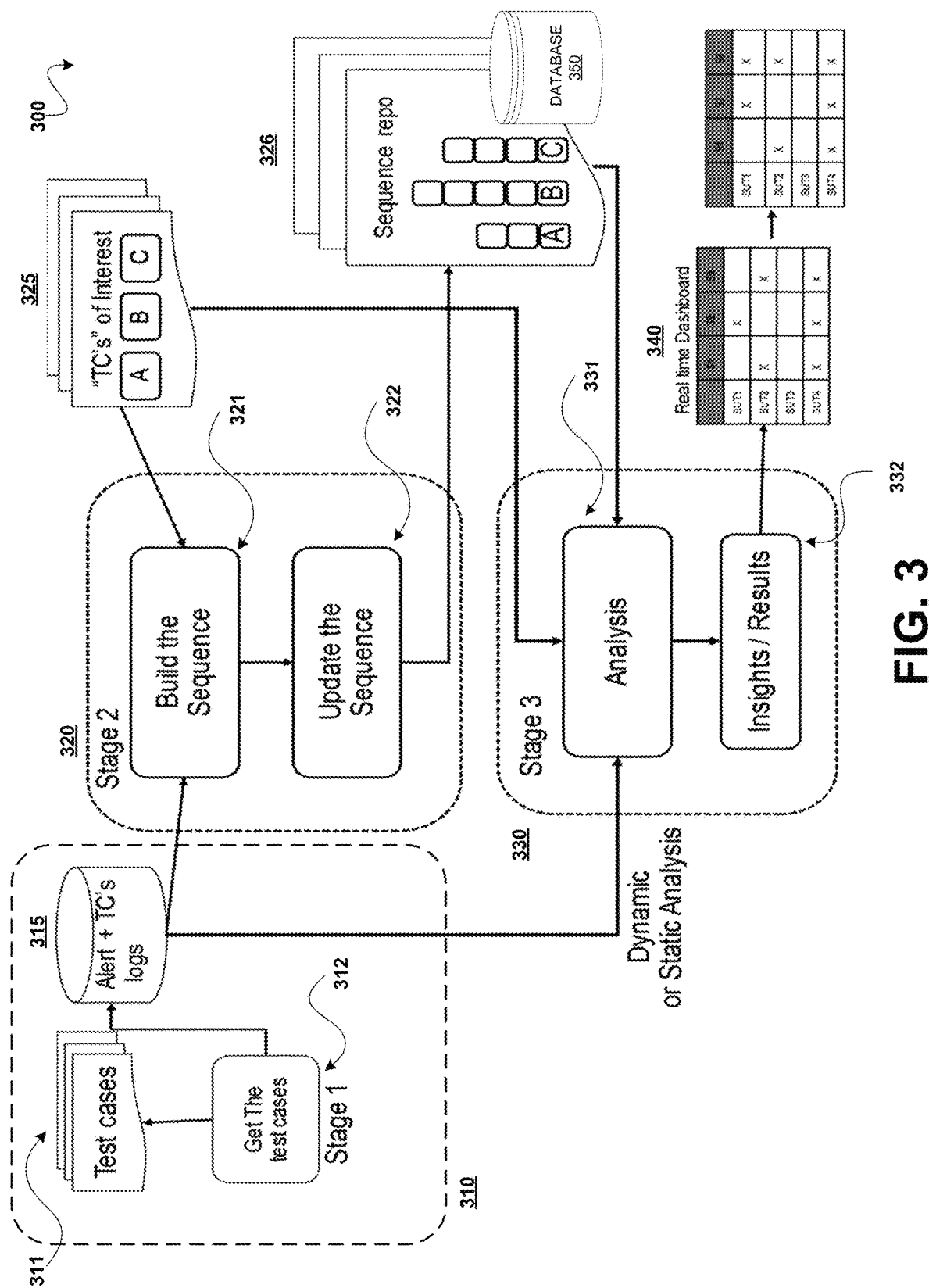
FIG. 3 illustrates an example of a logic flow performed by the AI/ML test analyzer shown in FIG. 1 for applying AI/ML techniques to test creation, test execution, and test prediction in software test automation, according to some embodiments.

FIG. 3 illustrates an example of a logic flow 300 that can be performed by the AI/ML test analyzer (shown in FIG. 1) for using AI/ML techniques to optimize software testing automation. In the illustrated example, the logic flow 300 is shown to include a general structure of three separate stages 310, 320, and 330. The first stage 310 (shown as "Stage 1" in FIG. 3) can involve the AI/ML test analyzer automatically collecting previously used test cases 305. For example, the test cases 305 collected in the first stage 310 may have been used during previous tests of older versions of a software application. Furthermore, data collected by the AI/ML test analyzer may include historical information related to previous software tests and/or other software testing platforms, such as data from histories of running test cases 305. In the example depicted in FIG. 3, a function 312 includes the AI/ML test analyzer collecting the test cases 305 and storing them with alert and test logs in database(s) 315. In this instance, database(s) 315 may be directly accessible to the AI/ML test analyzer to support saving any data it collects (e.g., being a part of the software test automation platform as shown in FIG. 1). In some embodiments, test cases 305 can be collected and stored in database(s) 315 by other software test automation platforms. As an example, the first stage 310 can include various different software test platforms automatically pushing any received and/or executed test cases 305 to be stored in database(s) 315. Also, test cases 305 may be predefined, or otherwise automatically generated, by the software automation platforms and then stored to database(s) 315. Database(s) 315 can be accessible to the AI/ML test analyzer, thereby allowing the analyzer to query these database(s) in order to receive test cases 305 for the second stage 320.

Additionally, FIG. 3 illustrates that other data related to software testing can be used by the AI/ML test analyzer. As depicted, database(s) 315 can also store test logs and alerts for subsequent analysis by the AI/ML test analyzer. In some instances, test logs and alerts (e.g., notifications generated by a testing platform in response to an encountered problem during testing) can be compiled from multiple software tests that have been run on platforms in the past. Accordingly, examining these historical test logs and alerts over time can be used as an information-rich tools as it to pertains to investigating previous testing environments, and furthermore is made accessible to the AI/ML test analyzer vis-à-vis the database(s) 315 for AI/ML processing.

It should be appreciated that the database(s) 315, including the data stored thereon, can be located locally or remotely with respect the AL/ML test analyzer. In an example, the AI/ML test analyzer can gather log data of prior test runs from the software test automation platform and associated database(s) 315 that it is connected to locally via a network (e.g., local area network). In other instances, log data can be collected by the AI/ML test analyzer from logs generated by platforms that are remotely located. Some real-world applications of software testing can include a distributed testing architecture, where multiple software testing platforms are located at various sites that are distributed across multiple geographies. Often times in these scenarios, although the software testing platforms are remotely located, the platforms are capable of communicating amongst each other (e.g., in order to support collaboration between multiple software developers). Thus, valuable information relating to the use and performance of different software testing environments can be shared with the AI/ML test analyzer. In reference to FIG. 3, the database(s) 315 may be remote to the AI/ML test analyzer, and the log data can be communicated to the AI/ML test analyzer in stage 310 in an appropriate manner, for instance by way of a wide area network (WAN) connection.

In a second stage 320 (shown as "Stage 2" in FIG. 3), the AI/ML test analyzer can obtain the test cases 305 and test logs from the database(s) 315. Subsequently, the AI/ML test analyzer can automatically build a sequence of test cases 335 that may be considered optimal based on AL/ML-driven analysis. In the example of FIG. 3, one or more test cases that may be particularly useful for test analysis, referred to herein as test cases of interest 325, can be obtained by the AI/ML test analyzer. The test cases of interest 325 may be entered by a user in some instances, such as a software developer writing code of test cases for a software workload (using the software test automation platform). Alternatively, the test cases of interest 325 may a predefined set of test cases, for example a test suite already saved to the platform. Then, by collectively analyzing the test cases of interest 325 and the data from database(s) 315, the second stage 320 can automatically generate a sequence and/or update a prior sequence for the test cases. As seen in FIG. 3, the second stage 320 can involve a function 321, as alluded to above, where the AI/ML test analyzer builds the sequence of test cases for a software workload. In an example, the AI/ML test analyzer can determine a sequence for the received test cases of interest 325 during second stage 320. Even further, function 322 can include updating, or otherwise modifying a sequence of test cases. According to the disclosed embodiments, the AI/ML test analyzer can continue its analysis as test cases are actively being run. Thus, while dynamically carrying out its analysis, the AI/ML test analyzer may determine during execution of a test (e.g., by analyzing additional run-time data) that testing can be further improved by updating the sequence of test cases. In this scenario, the analyzer can perform function 322 and update the current sequence for optimal performance. The particular sequence that is ultimately generated and/or modified in stage 320 may be an order that is predicted by AI/ML-driven analysis to improve one or more characteristics of the test process, such as the overall quality of the testing, the run-time time, or the percentage of defects found. Additionally, FIG. 3 illustrates an example embodiment where test case sequences generated by the AI/ML test analyzer can be stored by the system for further historical reference and/or analysis. As seen, the sequence report 335 can be stored in a database(s) 350. For purposes of discussion, run-time data as referred to herein can be described as data that is generating dynamically while software tests are run, for example on the software test automation platform. In some embodiments, run-time data can be logged in databases of the platform, and the AI/ML test analyzer is capable of performing text-analysis (or other AI/ML-driven analyses) on these logs.

Then, the AI/ML test analyzer may perform a third stage 330 (shown as "Stage 3" in FIG. 3), where the AI/ML test analyzer performs further AI/ML-driven analysis. In particular, the example in FIG. 3 shows that the third stage 330 can include analyzing a combination of the log data in database(s) 315 and the test cases of interest 325. As also described in reference to FIG. 1, the AI/ML test analyzer in this third stage 330 can use AI/ML analysis in order to present predictive insights and/or results (e.g., recommendations) to a software test automation platform, which may be further integrated into the test automation process. The analysis accomplished in the third stage 330 can be associated with one or more previously described capabilities of the AI/ML test analyzer. For example, the AI/ML test analyzer may perform a comparative analysis of the results from previous executed, or known, test cases during stage three 330. The illustrated example depicts a real-time dashboard 340 that may display the determined insights/results 332 via a GUI of the software test automation platform (shown in FIG. 1). As previously discussed, the AI/ML test analyzer, as disclosed herein, is capable of performing its AI/ML-driven analysis functions statically or dynamically. Accordingly, the analysis (or portions thereof) associated with the second stage 320 and third stage 330 described above, can be performed statically as part of developing the test cases and/or testing strategies, or dynamically in a manner that is concurrent with executing the test cases. Furthermore, as discussed in detail with reference to FIG. 1, it should be appreciated that the AI/ML test analyzer can perform analysis for manual and/or automated software testing processes.

Figure 4:
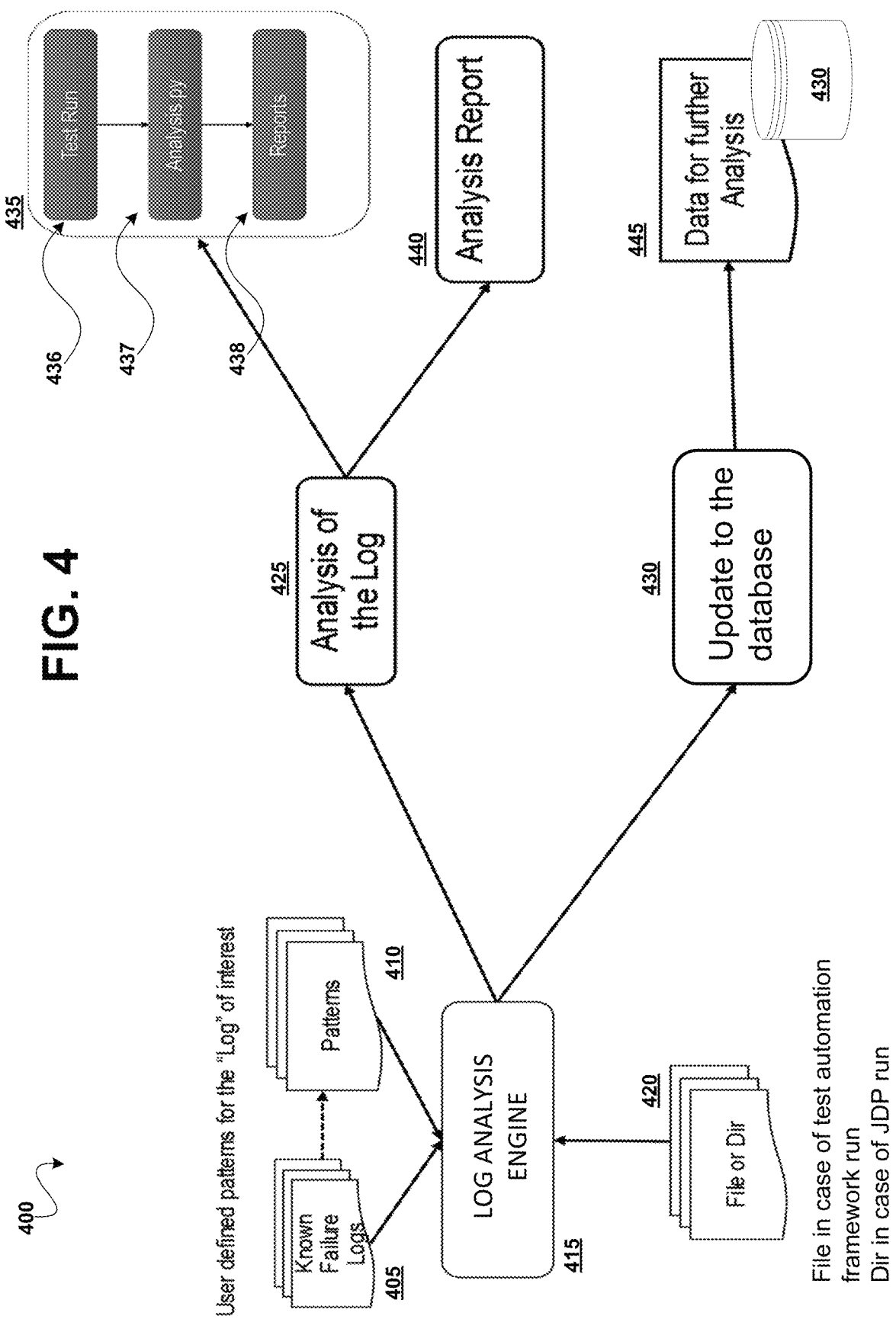
FIG. 4 illustrates an example of a log analysis approach used by the AI/ML test analyzer shown in FIG. 1, according to some embodiments.

Referring now to FIG. 4, an example of a log analysis approach 400 that can be used by the AI/ML test analyzer is depicted. As an underlying concept of ML, the presence of more data (e.g., increasing the size of the data set) can enhance performance of the process and result in improved and/or more accurate models. Accordingly, collecting vast amounts of data pertaining to previously run test cases may lend itself to powerful and information-rich AI/ML tools. Nonetheless, there may be a design tradeoff between the amount of data used during AI/ML analysis, and the overall speed of the testing process. Is some instances, it may be desirable to tune information from the potentially large amounts of data that can be collected in test logs over a substantial time period. To address these concerns, the disclosed system can utilize the log analysis approach shown in FIG. 4 to target specific data.

In the illustrated example, the AI/ML test analyzer can utilize a log analysis engine 415 that can be particularly configured for analyzing logs data to be tuned, or otherwise selected, as alluded to above. FIG. 4 shows that the log analysis engine 415 can collected various information for its analysis, including files or directories 420, known failure logs 405, and patterns 410. Referring to the files or directories 420, the log analysis engine 415 may receive files 420 in the case of test automation frameworks. Alternatively, the log analysis engine 415 may receive directories 420 in the case of a Java Design Pattern (JDP) run. The known failures logs 405 can include data that is related to instances where running a test was problematic or did not execute nominally. Types of data that may be included in known failure logs can include but are not limited to: errors; issues; corrective actions; and the like. Accordingly, there may be a large amount of data that is collected in the known failure logs 405 that can be indicative of failures that were encountered during previous tests that can be considered by the AI/ML test analyzer. Thus, patterns 410 can be employed by the system to identify patterns in the logs to tune the data that is further analyzed by the AI/ML test analyzer. In the illustrated example, text analysis of the known failure logs 405 can be performed by engine 415. In another example, text analysis can be applied to known failure logs 405 in order to identify whether any of the received patterns 410 are present in the data. If so, the AI/ML test analyzed can determine that the information is of interest, and the data is subsequently further analyzed by AI/ML test analyzer. Furthermore, the AI/ML test analyzer can correlate test related data with the different patterns, as observed over a period of time. According to some embodiments, the patterns 410 can be defined by a user, so as to define which logs can be analyzed. In some embodiments, the system can automatically correlate patterns, such as patterns 410, to error and/or warning information.

Additionally, the AI/ML aspects of the system can implement automatically update to the patterns 410 to operate in a manner similar to a self-healing process. As data is tuned using AI/ML analysis, in an example, the data can be refined such that it can support updates to the patterns 410, and then be used to determine the best logs to analyze in optimizing the particular set of test cases. In turn, the data can be further tuned based on the selected the logs to analyze in a feedback style process. Moreover, the system can perform AI/ML techniques in order to predict an arrival of one or more of the patterns 410 in a sequence.

Also, in the example, output from the analysis engine 415 can follow a branch that communicates the log data to be analyzed at function 425. The analysis at function 425 can be the AI/ML-driven analysis as previously discussed. For purposes of brevity, details of AI/ML analysis of logs that may be performed at function 425 that is similar to the details described in reference to the capabilities of the AI/ML test analyzer in FIG. 1, for example, will not be described again regarding FIG. 4. From the analysis of function 425, the log data can be fed to a software automation test platform 435. In the example, the software automation test platform 435 can include executing a test run 436, an analysis script 437 (e.g., a file written in Python having a ".py" extension) and generating reports 438. In some instances, the results of the analysis 425 can be included in an analysis report 440. In another branch, the output from the log analysis engine 415 can be used to update databases at function 430. Maintaining data related to the analyzed logs may be useful to the system for various purposes, such as storing which of the known failure logs 405 are selected in order to derive tuned data Accordingly, FIG. 4 illustrates an embodiment where a database 430 can be updated at function 430 based on the information from the log analysis engine 415. As seen, data for further analysis 445 can be stored in database 430. In an example, the database 43, including the log analysis data, can be accessed by the AI/ML test analyzed in order to subsequently analyze to the same logs (e.g., previously selected based on patterns 410) which can potentially improve the efficiency of testing.

Figure 5:
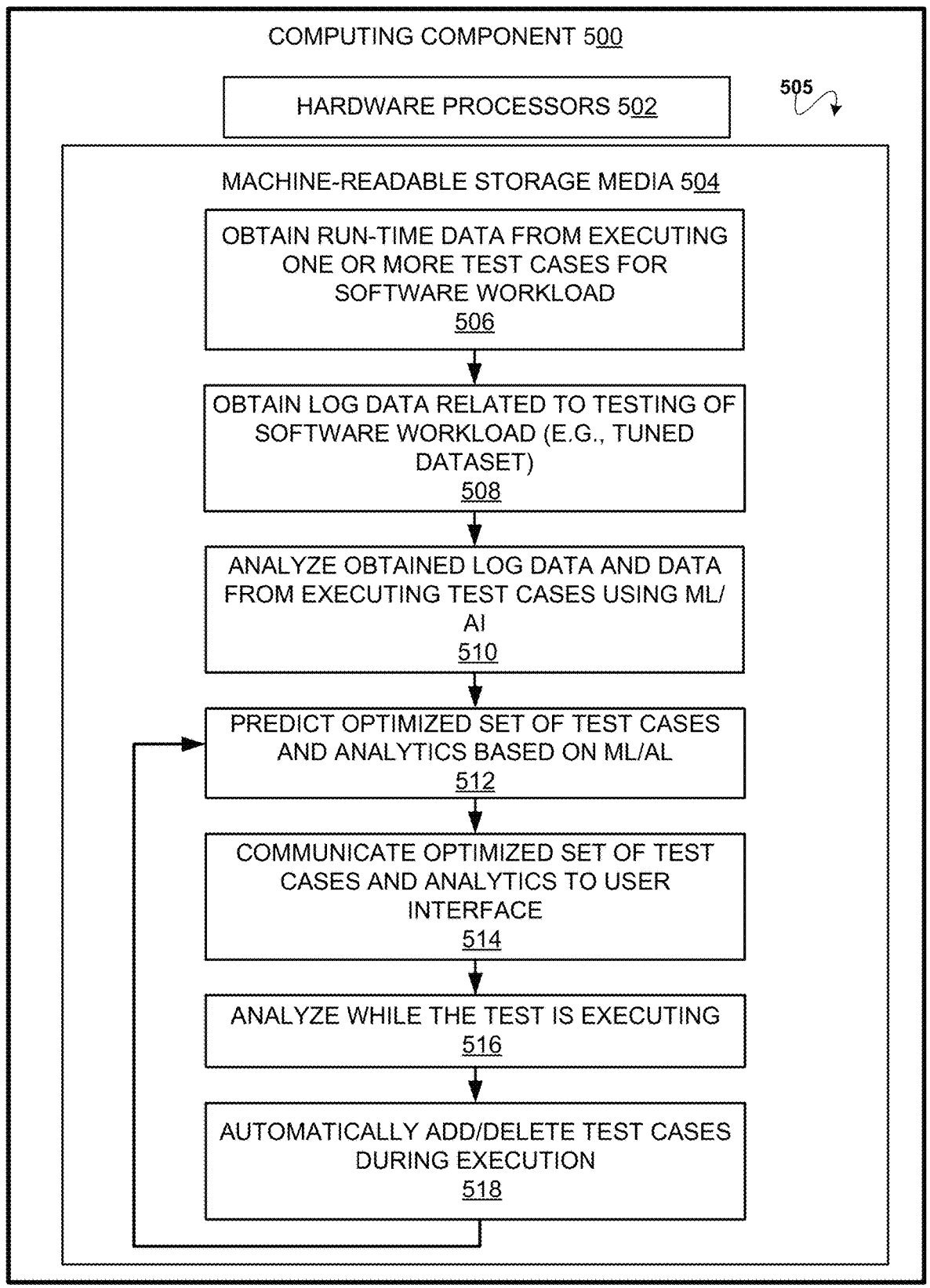
FIG. 5 is an operational flow diagram illustrating an example of a process for applying AI/ML techniques to test creation, test execution, and test prediction in software test automation, according to some embodiments.

Further details of the amalgamation of AI/ML in test creation, test execution, and test prediction, for the optimization of software testing automation are now described with reference to FIG. 5. An example of a process 505 according to an embodiment of the systems and methods described herein, is illustrated in FIG. 5. As seen in FIG. 5, process 505 is illustrated as a series of executable operations in a machine-readable storage media 504 performed by a hardware processor 502. The computing component 500 can the AI/ML test analyzer (shown in FIG. 1), as previously described.

In an operation 506, run-time data from executing one or more tests cases for a software workload may be obtained. The test cases may be written (e.g., writing code for test scripts) and a strategy for navigating a path through the set of test cases can be developed using a software test automation platform, as an example. In some examples, the test cases may be obtained in a particular predefined sequence, which governs the manner in which the test flows during execution. The test cases can be generated and sequenced automatically, in accordance with the automation capabilities of the system in some embodiments. Furthermore, in some instances, the disclosed AI/ML-driven analysis can be performed as part of the developmental process for creating the test cases. That is, log data related to previous tests and/or the one or more test cases can be analyzed using AI/ML-driven techniques prior to the test cases being obtained in operation 506.

Next, at operation 508, log data related to testing the software workload can be obtained. In some embodiments, the log data can be tuned using techniques particularly applied for analyzing log data (e.g., text analysis), as discussed in detail in reference to FIG. 4 (e.g., in order to select which logs, and the data included therein, that are further analyzed). Some examples of tuned datasets can include, but are not limited to: lab servers; analysis engine data; test platform data; test dashboard data; ALM data; and the like. In some instances, the log data is automatically collected from logs compiled from histories of previously run tests (e.g., static). Additionally, operation 508 can involve obtaining logs generated during the current execution of the test cases obtained in operation 506. Logs related to run-time data may be automatically collected for analysis, while the test continues to execute (e.g., dynamic). The process 505 can then proceed to operation 510.

At operation 510, the log data can be analyzed using the AI/ML-driven techniques disclosed herein. In some embodiments, the analysis involves natural language processing (NLP) techniques, in order to perform analysis such as pattern recognition. Other forms of AI/ML approaches may be used to implement the analysis in operation 510 as deemed necessary and/or appropriate. By leveraging AI/ML-driven analysis of test data, the disclosed software test automation techniques can achieve a data-driven management of tests. In accordance with the embodiments, the test data (including historical log data and run-time log data) can be automatically analyzed using AI/ML, in a manner that can modify the course and flow of the test in order to optimize the test's performance. In some instances, analysis at operation 510 can continue to run as the process 505 progresses, thereby enabling any new and/or updated data that may be gleaned by furthering execution can be dynamically analyzed. It should be appreciated that when the process 505 continues to the subsequent operations, the analysis of 510 may automatically continue in the background.

Next, at operation 512, an optimized set of test cases can be predicted based on the AI/ML analysis accomplished at operation 510. For example, the AI/ML-driven analysis may predict that a different sequence for the test cases may be optimal for improving coverage of testing for the software workload. As a result, the obtained sequence of test cases may be modified to generate an optimized set of test cases that are arranged using the optimal sequence predicted by the AI/ML. The optimized set of test cases may be predicted at operation 512 in accordance with other test enhancing capabilities driven by AI/ML analysis disclosed herein. In some cases, the optimized set of test cases can include predicted next test cases, a predicted sequence for the test cases, and the like. Additionally, operation 512 can include predicting analytics for the test cases based on conducting AI/ML analysis. As an example, failure rates of the received test cases can be a predicted analytic.

Subsequently, at operation 514, the optimized set of test cases and analytics may be communicated automatically as recommendations to optimize testing for output by the software test automation platform. Also, additional recommendations based on the AI/ML analysis of the test data (e.g., test cases and logs) may be communicated. Operation 514 can involve determining recommendations that include but are not limited to: test cases that can be ignored; test cases that can be added; an updated sequence of test cases that can be applied for the software workload, and the like. In accordance with some embodiments, the recommendations can be presented to a user via a user interface associated with the software testing automation platform. As previously described in reference to FIG. 1, the user interface may be a display device of the platform, such as touchscreen of a computer device. In an embodiment, the automated recommendation provided by the system is intended to prompt a user for entering input to allow the recommended modifications to be integrated into testing the software workload. For instance, the recommendations can be displayed to a user via a GUI, such as a software testing engineer, which includes a visual cue prompting user interaction to approve or deny the recommendations. In the case where the user accepts the automated recommendations, for example, the system can automatically configure the test to incorporate the optimized set of test cases based on the AI/ML analysis. Alternatively, in the scenario where the user denies the automated recommendations, the system may continue to execute testing using the initial test cases, without incorporating the optimized set of test cases.

The process 505 can then proceed to 516, where analysis can continue while the test continues to execution. In some embodiments, the disclosed AI/ML-driven analysis dynamically persists until execution of tests for the software workload is complete. Thus, the system can automatically analyze any updates and/or modifications that may be incorporated into the testing using AI/ML. As such, the process 505 operates in a self-healing manner, where data resulting from prior analysis (e.g., analysis at operation 510) is integrated into operation and then subjected to further analysis (e.g., analysis at operation 516) to refine the process while it is executing. Thus, the embodiments provide an AI/ML-driven and automated software testing process 505 which improves itself automatically, requiring limited human interactions.

As a result of the analysis at operation 516, it can be further determined that testing can be dynamically optimized by adding and/or deleting test cases. For example, operation 518 can determine that one or more test cases (e.g., not included in the current set of test cases) are defect yielding for the software workload. Therefore, the defect yielding test cases can be automatically added to the executed testing as new test cases. Furthermore, process 505 is illustrated as being iterative, returning back to operation 512 in order to automatically update its AI/ML-driven predictive aspects with respect to the modifications integrated into testing. It should be appreciated that although the process 505 is described as automated software testing, that the AI/ML analysis techniques disclosed herein can also be applied to manual software testing. Accordingly, process 505 can include one or more manually performed test operations that may be also be subject to AI/ML analysis as described.

Figure 6:
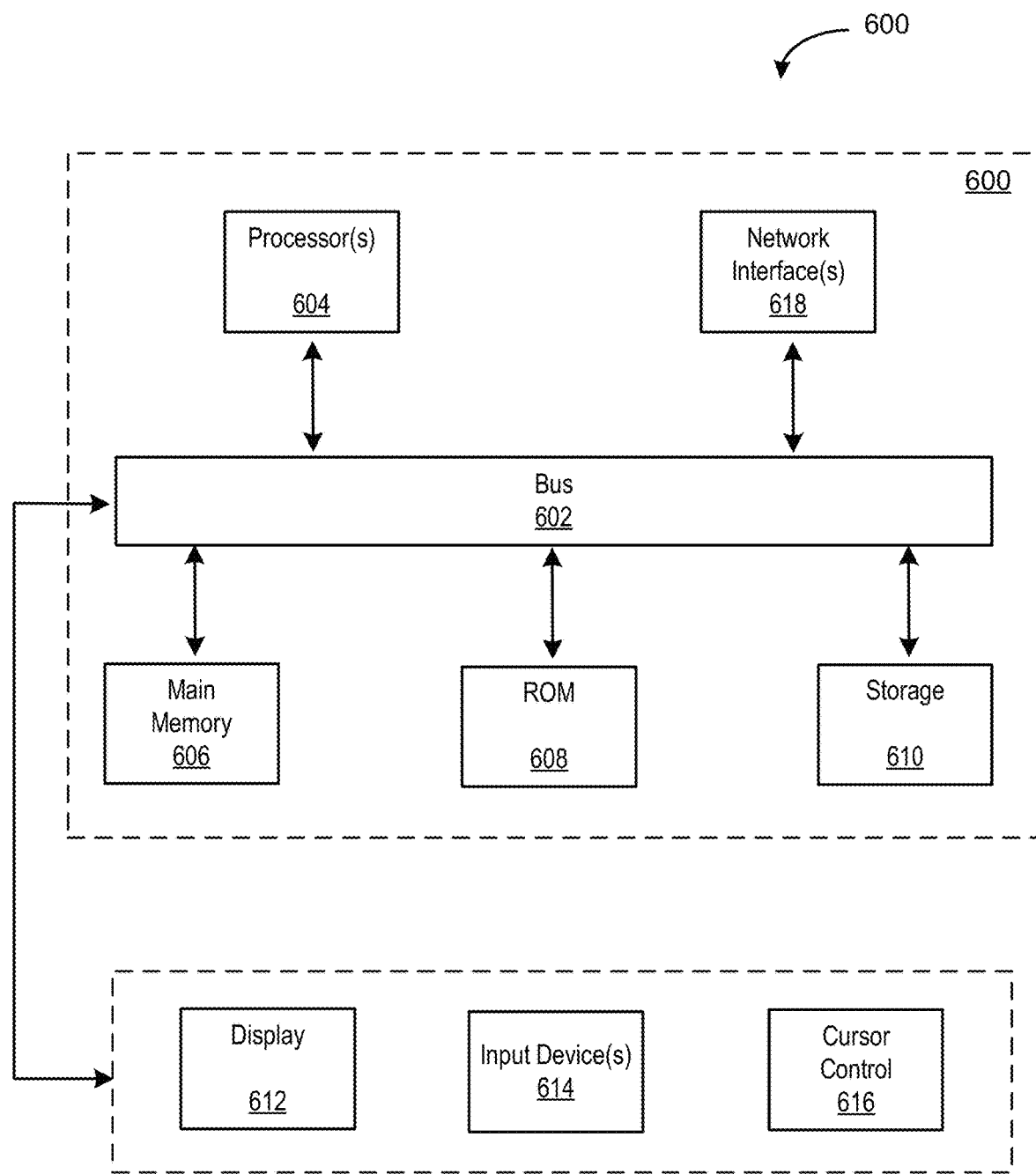
FIG. 6 illustrates an example computer system that may be used in implementing support applying AI/ML in relating to the embodiments of the disclosed technology.

FIG. 6 depicts a block diagram of an example computer system 600 in which the software testing automation embodiments, including AL/ML analysis, as described herein may be implemented. As an example, the computer system 600 may be an AI/ML test analyzer (shown in FIG. 1). The computer system 600 includes a bus 602 or other communication mechanism for communicating information, and one or more hardware processors 604 coupled with bus 602 for processing information. Hardware processor(s) 604 may be, for example, one or more general purpose microprocessors.

The computer system 600 also includes a main memory 608, such as a random-access memory (RAM), cache and/or other dynamic storage devices, coupled to bus 602 for storing information and instructions to be executed by processor 604. Main memory 608 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor 404 may be programmed by one or more additional instructions that may perform some or all of the functionality attributed herein to one of the instructions.

The computer system 600 further includes storage device 610. The various instructions described herein, including the ADC list concatenation techniques, may be stored in a storage device 610, which may comprise read only memory (ROM), and/or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions. The storage device 610 may store the computer program instructions (e.g., the aforementioned instructions) to be executed by processor 604 as well as data that may be manipulated by processor 604. The storage device may comprise one or more non-transitory machine-readable storage media such as floppy disks, hard disks, optical disks, tapes, or other physical storage media for storing computer-executable instructions and/or data.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 608. Such instructions may be read into main memory 608 from another storage medium, such as storage device 610. Execution of the sequences of instructions contained in main memory 608 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 608. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated service digital network (ISDN) card, cable modem, satellite modem, or a modem to provide a data communication connection to a corresponding type of telephone line. As another example, network interface 618 may be a local area network (LAN) card to provide a data communication connection to a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. Wireless links may also be implemented. In any such implementation, network interface 618 sends and receives electrical, electromagnetic or optical signals that carry digital data streams representing various types of information. The nodes of the decentralized model building system, as disclosed herein, may be coupled to other participant nodes via the abovementioned networks.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 418.

The received code may be executed by processor 604 as it is received, and/or stored in storage device 410, or other non-volatile storage for later execution.

The various processes, methods, operations and/or data flows depicted in FIG. 5 (and in the other drawing figures) described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard,"

"known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
and
one or more processors; and
a computer-readable storage device coupled to the one or more processors and having instructions stored thereon which, when executed by the one or more processors cause the one or more processors to perform operations of:
obtaining run-time data during executing multiple test cases for a software workload;
obtaining test logs from the one or more storage devices, wherein test log data from each of the test logs is related to previous executions of the tests cases for the software workload;
automatically analyzing, before completing a software testing process, the test log data and the run-time data by applying AI/ML for recognizing patterns associated with the executed tests cases over a period of time;
automatically predicting, based on the AI/ML tools analyses, an optimized set of test cases and analytics related to execution of the test cases for the software workload;
communicating the predicted optimized set of test cases and analytics to the software test automation platform;
initiating execution of the predicted optimized set of test cases and analytics;
obtaining run-time data from execution of the predicted optimized set of test cases and analytics; and
applying AI/ML to update, prior to completion of the predicted optimized set of test cases, the predicted optimized set of test cases based on the run-time data obtained during execution of the predicted optimized set of test cases.

2. The system of claim 1, wherein the computer-readable storage device further causes the one or more processors to perform:
determining automated recommended actions relating to a sequence of test cases within the optimized set of test cases.

3. The system of claim 2, wherein the automated recommended actions comprise at least one of: ignoring a test case; adding a new test; and applying an updated sequence to test cases within the optimized set of test cases for the software workload.

4. The system of claim 1, further comprising a user interface communicatively connected to the software test automation platform.

5. The system of claim 3, wherein the user interface obtains input for approving or denying the automated recommended actions.

6. The system of claim 1, wherein the software test automation platform executes the multiple test cases for the software workload such that the software run-time data is generated.

7. The system of claim 6, wherein the AI/ML test analyzer automatically analyzes the test log data and the run-time data concurrently as the software test automation platform executes the multiple test cases for the software workload.

8. The system of claim 7, wherein the AI/ML test analyzer automatically predicts the automated recommended actions concurrently as the software test automation platform executes the multiple test cases for the software workload; and communicates the predicted optimized set of test cases and analytics to the software test automation platform prior to completing execution of the multiple test cases for the software workload.

9. The system of claim 1, wherein the computer-readable storage device further causes the one or more processors to perform:
automatically predicting one or more defect yielding test cases; and
automatically adding the one or more defect yielding test cases to the optimized set of test cases for the software workload.

10. The system of claim 1, wherein the computer-readable storage device further causes the one or more processors to perform:
obtaining one or more defined patterns relating to logs of interest; and
analyzing the test log data from the one or more storage devices based on the defined patterns to selectively collect test logs data from the logs of interest, and prior to automatically analyzing the test log data by applying AI/ML; and
communicating the test log data only from the logs of interest for automatically analyzing by applying AI/ML.

11. A non-transitory computer-readable storage medium having executable instructions stored thereon that, when executed by a processor, causes the processor to perform operations of:
obtaining run-time data during an execution of multiple test cases for a software workload;
obtaining test log data from multiple test logs, wherein the log data from each of the test logs is related to previous executions of the tests cases for the software workload;

automatically analyzing, before completing a software testing process, the log data and the run-time data by applying AI/ML for recognizing patterns associated with the executed tests cases over a period of time;

automatically predicting, based on the AI/ML analyses, an optimized set of test cases and analytics related to execution of the test cases for the software workload;

communicating the predicted optimized set of test cases and analytics to a software test automation platform;

initiating execution of the predicted optimized set of test cases and analytics;

obtaining run-time data from execution of the predicted optimized set of test cases and analytics; and applying AI/ML to update, prior to completion of the predicted optimized set of test cases, the predicted optimized set of test cases based on the run-time data obtained during execution of the predicted optimized set of test cases.

12. The non-transitory computer-readable storage medium of claim 11, wherein the instructions, when executed by the processor, further cause the processor to perform:

determining automated recommended actions relating to a sequence of test cases within the optimized set of test cases.

13. The non-transitory computer-readable storage medium of claim 12, wherein the automated recommended actions comprise at least one of: ignoring a test case; adding a new test; and applying an updated sequence to test cases within the optimized set of test cases for the software workload.

14. The non-transitory computer-readable storage medium of claim 11, wherein the instructions, when executed by the processor, further cause the processor to perform:

presenting a user interface for interacting with the software test automation platform.

15. The non-transitory computer-readable storage medium of claim 13, wherein the user interface obtains input for approving or denying the automated recommended actions.

16. The non-transitory computer-readable storage medium of claim 11, wherein the run-time data is obtained from a software test automation platform executing the multiple test cases for the software workload.

17. The non-transitory computer-readable storage medium of claim 16, wherein automatically analyzing the test log data and the run-time data occurs concurrently as the software test automation platform executes the multiple test cases for the software workload.

18. The non-transitory computer-readable storage medium of claim 17, wherein automatically predicting the automated recommended actions occurs concurrently as the software test automation platform executes the multiple test cases for the software workload, and communicating the predicted optimized set of test cases and analytics to the software test automation platform occurs prior to completing execution of the multiple test cases for the software workload.

19. The non-transitory computer-readable storage medium of claim 18, wherein the instructions, when executed by the processor, further cause the processor to perform:

automatically predicting one or more defect yielding test cases; and automatically adding the one or more defect yielding test cases to the optimized set of test cases for the software workload.

20. The non-transitory computer-readable storage medium of claim 11, wherein the instructions, when executed by the processor, further cause the processor to perform:

obtaining one or more defined patterns relating to logs of interest;

analyzing the test log data from the one or more storage devices based on the defined patterns to selectively collect test logs data from the logs of interest, and prior to automatically analyzing the test log data by applying AI/ML; and communicating the test log data only from the logs of interest for autonnatically analyzing by applying AI/ML.

* * * * *